United States Patent
Robertson et al.

(10) Patent No.: US 10,853,500 B2
(45) Date of Patent: Dec. 1, 2020

(54) METHOD AND SYSTEM FOR IDENTIFYING VIRTUALIZED APPLICATIONS

(71) Applicant: Xerox Corporation, Norwalk, CT (US)

(72) Inventors: Alan K. Robertson, Rochester, NY (US); Glenn K. Smith, Webster, NY (US)

(73) Assignee: Xerox Corporation, Norwalk, CT (US)

(*) Notice: Subject to any disclaimer, the term of this patent is extended or adjusted under 35 U.S.C. 154(b) by 163 days.

(21) Appl. No.: 16/056,199

(22) Filed: Aug. 6, 2018

(65) Prior Publication Data

US 2020/0042713 A1 Feb. 6, 2020

(51) Int. Cl.
 *G06F 21/57* (2013.01)
 *G06F 9/455* (2018.01)
 *G06F 11/30* (2006.01)

(52) U.S. Cl.
 CPC ........ *G06F 21/577* (2013.01); *G06F 9/45545* (2013.01); *G06F 11/301* (2013.01); *G06F 11/3051* (2013.01)

(58) Field of Classification Search
 CPC .. G06F 21/577; G06F 9/45545; G06F 11/301; G06F 11/3051; G06F 21/53
 USPC .................................................. 726/22
 See application file for complete search history.

(56) References Cited

U.S. PATENT DOCUMENTS

| | | |
|---|---|---|
| 7,565,568 B1 | 7/2009 | Kumar |
| 7,845,009 B2 | 11/2010 | Grobman |
| 9,250,940 B2 | 2/2016 | Mickens |
| 9,519,781 B2 | 12/2016 | Golshan |
| 9,678,927 B2 | 6/2017 | Kundu |
| 2010/0161768 A1 | 6/2010 | Daniel |
| 2012/0135710 A1* | 5/2012 | Schell ............... G06F 3/0679 455/411 |
| 2012/0258777 A1 | 10/2012 | Huang |
| 2012/0260250 A1* | 10/2012 | Maeda ............... G06F 21/53 718/1 |
| 2013/0275671 A1* | 10/2013 | Domsch ............. G06F 3/0665 711/114 |

* cited by examiner

*Primary Examiner* — Kambiz Zand
*Assistant Examiner* — Aubrey H Wyszynski
(74) *Attorney, Agent, or Firm* — Ortiz & Lopez, PLLC; Luis M. Ortiz; Kermit D. Lopez

(57) ABSTRACT

A system, method and apparatus for detecting whether an application is virtualized comprises identifying a storage location relevant to an application; writing a value to the storage location, storing the value written to the storage location, reading the identified storage location with a non-virtualized process, and checking if the read from the non-virtualized process matches the value.

20 Claims, 9 Drawing Sheets

METHOD AND SYSTEM FOR IDENTIFYING VIRTUALIZED APPLICATIONS

TECHNICAL FIELD

Embodiments are generally related to the field of computing. Embodiments are further related to the field of virtualization and sandboxing technology. Embodiments are also related to methods, systems, and devices for data storage. Embodiments are further related to methods, systems, and devices for efficiently and securely using a system process as a proxy to enable access to the real system registry instead of the private, virtualized copy within each application's sandbox.

BACKGROUND

Computer security concerns have resulted in an increasing number of protective measures taken to help prevent unintended installation of malware and other potentially damaging software. One such approach requires the use of sandboxing. Sandboxing is a security measure wherein an application is isolated from the underlying system level resources so that any malware, or other such unwanted software application, does not have access to the core system processes. Similarly, virtualization technology permits traditional applications to be re-packaged and distributed via an electronic store. Virtualization ensures that the application cannot write to the system memory and/or storage, thus ensuring the system cannot be corrupted.

For example, modern software includes virtualization and sandboxing to limit the damage a rogue web page can do to harm a user's computer system. This trend has continued, such that many applications including, for example, Microsoft Office® have been virtualized and run in a sandbox. This enables users to completely remove the application, and all traces of its settings, in the system registry and storage by simply deleting the sandbox.

While virtualization offers an improvement in system security, it has also had an undesirable side-effect on non-malicious applications. For example, many virtualized applications support drivers, extensions, plugins, or other features that run within the application's sandbox and are therefore subject to the security and permissions limitations intrinsic to virtualization. These affected drivers, extensions, plugins, and other features may often be dependent on having fast access to caches of data (which may be time-consuming to recreate), user-preference settings, and other data that need to be accessible across all applications. Virtualization has resulted in failure of these drivers, extensions, plugins, and other features because sandboxed applications can only see changes that have been written by that application.

Accordingly, there is a need in the art for methods and systems that facilitate identification of sandboxing or other such virtualization as described in the embodiments disclosed herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus for data storage.

It is another aspect of the disclosed embodiments to provide a method, system, and apparatus for identifying an application as virtualized.

It is another aspect of the disclosed embodiments to provide a method, system, and apparatus for identifying an application as not virtualized.

It is another aspect of the disclosed embodiments to efficiently and securely use a system process as a proxy to enable access to the real system registry instead of the private, virtualized copy within each application's sandbox.

In the embodiments disclosed herein a system and method comprise a rendering device, at least one processor; and a storage device communicatively coupled to the at least one processor, the storage device storing instructions which, when executed by the at least one processor, cause the at least one processor to perform operations comprising identifying a storage location relevant to an application, writing a value to the storage location, storing the value written to the storage location on the application, reading the identified storage location with a non-virtualized process, and checking if the read from the non-virtualized process matches the value.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
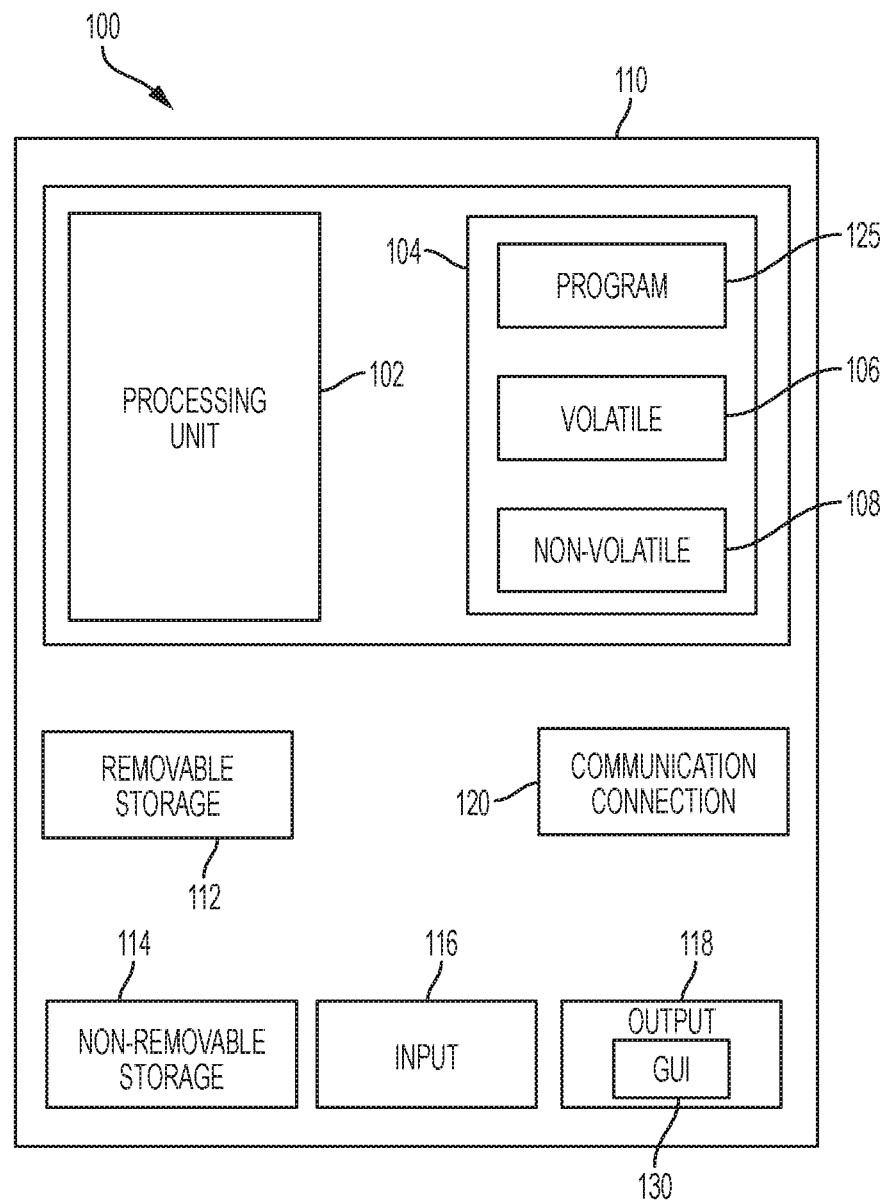
FIG. 1 depicts a block diagram of a computer system which is implemented in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 2:
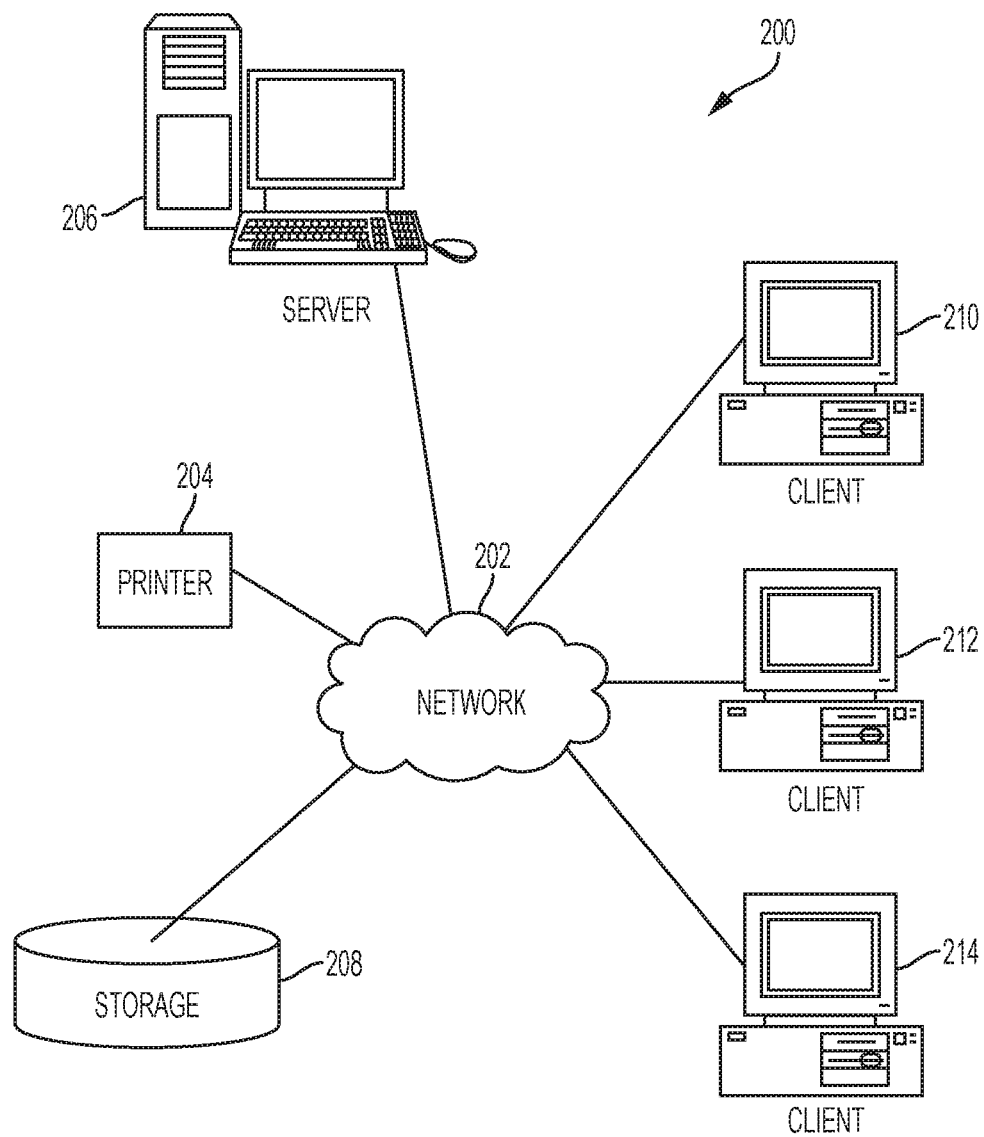
FIG. 2 depicts a graphical representation of a network of data-processing devices in which aspects of the present embodiments may be implemented.
Figure 3:
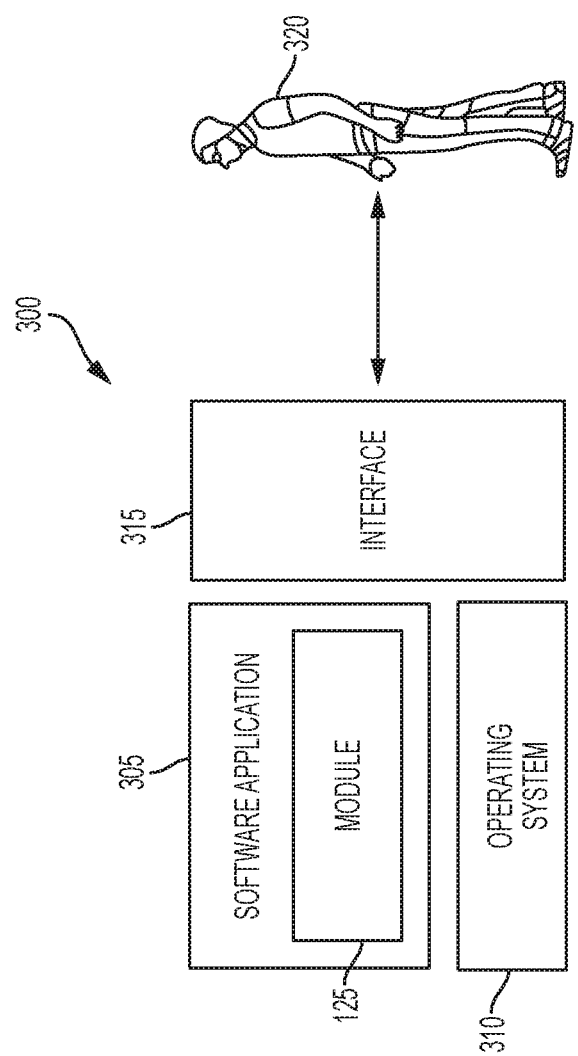
FIG. 3 illustrates a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage as described herein includes, for example, disc storage, disk storage, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Discs (DVD) or other optical disc storage, magnetic cassettes, magnetic tape, magnetic disk storage, or other magnetic storage devices, or any other medium capable of storing computer-readable instructions as well as data including image data.

Computer 110 may include, or have access to, a computing environment that includes input 116, output 118, and a communication connection 120. The computer may operate in a networked environment using a communication connection 120 to connect to one or more remote computers, remote sensors and/or controllers, detection devices, handheld devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 can be a network of computers or other such devices, such as mobile phones, smart phones, sensors, controllers, speakers, tactile devices, and the like, in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more printing devices 204, servers 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 206, one or more external devices such as multifunction device or printer 204, and a memory storage unit such as, for example, memory or database 208. It should be understood that printing device 204 may be embodied as a printer, copier, fax machine, scanner, multifunction device, rendering machine, photocopying machine, or other such rendering device.

In the depicted example, printer 204, server 206, and clients 210, 212, and 214 connect to network 202 along with storage unit 208. Clients 210, 212, and 214 may be, for example, personal computers or network computers, handheld devices, mobile devices, tablet devices, smart phones, personal digital assistants, printing devices, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and printing device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" type system, such as Microsoft Windows®. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation.

The embodiments disclosed herein are drawn to methods and systems for improving machine efficiency by quickly identifying whether an application is using virtualized storage or non-virtualized storage.

Figure 4:
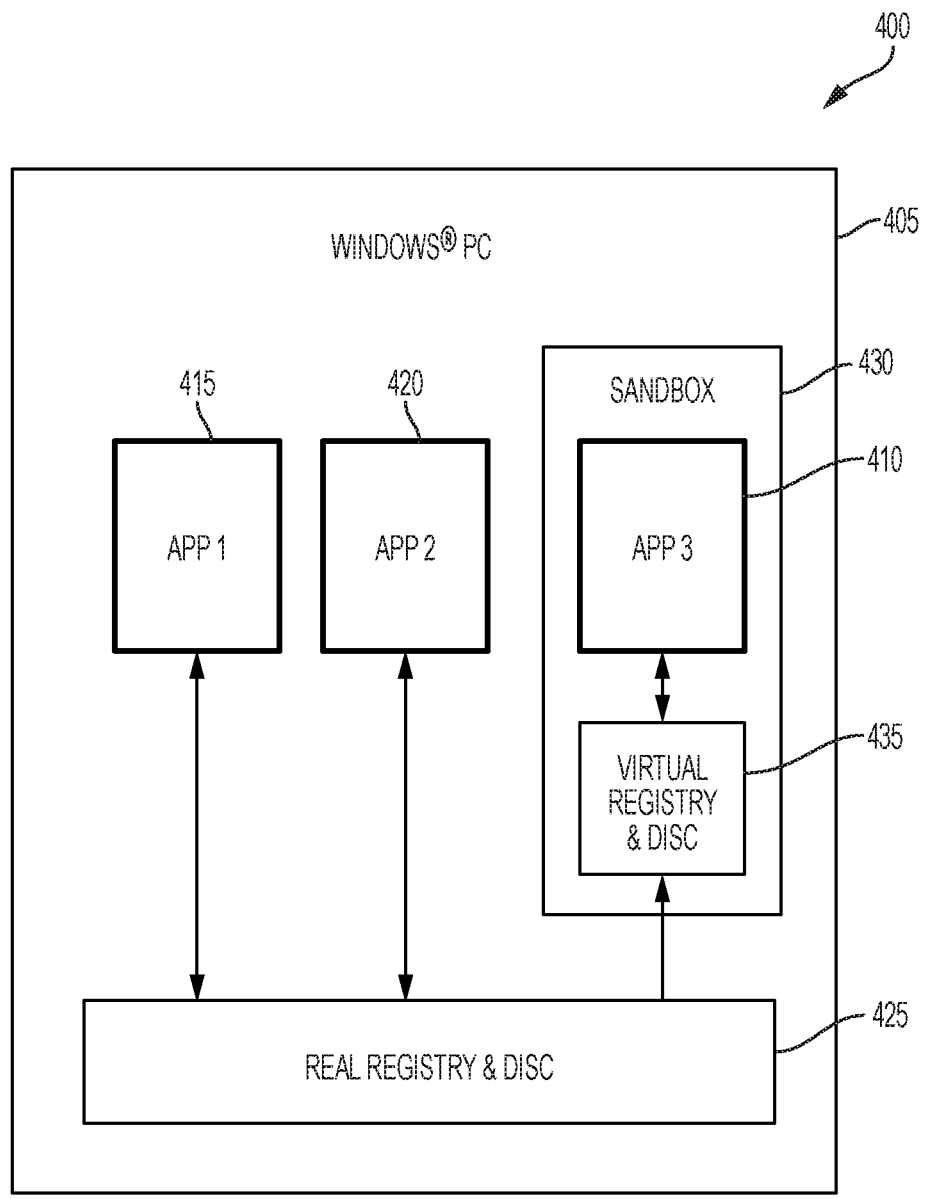
FIG. 4 depicts a block diagram of system components in accordance with the disclosed embodiments.

FIG. 4 illustrates a block diagram 400 of a sandboxed application 410 associated with a computer 405. A number of applications, that can be considered user applications or external applications, are shown. These applications include first application 415, second application 420, and sandboxed application 410.

The first and second applications 415 and 420 are configured to read and write to the real registry and real storage 425 (e.g. a "disk" or "disc") of the PC 405. However, sandboxed application 410 is not capable of writing to the real registry and real storage 425. Instead, the sandboxed application 410 is contained in a sandbox 430.

The sandbox 430 includes a virtual registry and virtual storage 435 (e.g. a "disk" or "disc"). The sandboxed application 410 is allowed to read and write to the virtual registry and virtual storage 435. The virtual registry and virtual storage 435 can then access the real registry and real storage 425 where permanently stored data can be accessed.

Note that the virtual registry and storage 435 can access information on the real registry and storage 425, but cannot write to the real registry and storage 425. In this arrangement, the sandboxed application 410 is thus incapable of writing directly to the real registry and storage 425, thereby preventing corruption of the real registry and storage 425, by malware, or other such nefarious code that may be associated with sandboxed application 410.

Features associated with drivers (e.g. print drivers for Microsoft Windows®) require some form of per-user global storage for data. Such data can include passcodes, custom definitions, caches of data that are needed to maintain good performance, user preference settings, or other such information, that needs to be accessible, for example when printing from an application 410. These data can be written to the user's registry (e.g. HKEY_CURRENT_USER). Many such applications include widespread sandboxing and virtualization of the applications, as illustrated in FIG. 4.

One common requirement, is to enable unmodified applications to run in the sandbox. That means that the sandbox is intentionally designed to appear fully transparent. In other words, the virtualized software, has no intrinsic way of knowing it has been sandboxed. As such, there is typically no API one can call to ask if it is running in a sandbox.

In situations where the driver (e.g. the print driver) runs inside a sandbox, it can only update the private, virtualized copy of the user's registry and storage. Those private copies cannot be used to share data across applications. One solution is to identify which applications are writing to virtualized storage locations and which are writing to real ones. In cases where a real storage location is being used, the fast, native APIs can be used to write data. When the driver needs to write to a storage location that has been virtualized, the driver can choose to use an intermediary. However, using an intermediary incurs additional computational overhead and is slower.

Figure 5:
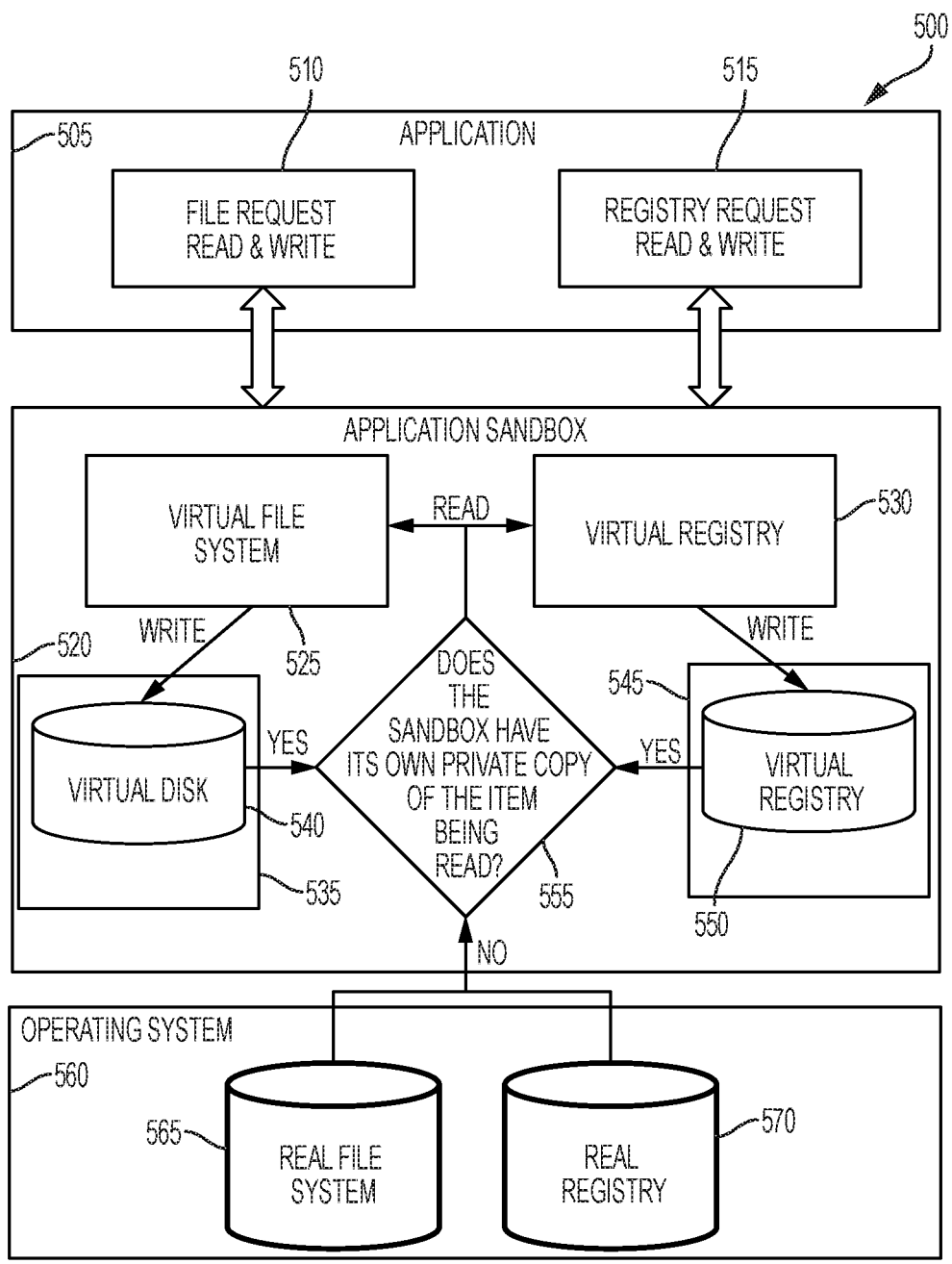
FIG. 5 depicts flow chart of steps associated virtualized application processing in accordance with the disclosed embodiments.

FIG. 5 illustrates a block diagram 500 showing standard application workflow for a virtualized application, in accordance with the disclosed embodiments. An application 505 includes file requests 510 and registry requests 515. The file request 510 is configured to read and write. The registry request 515 is also configured to read and write. It should be understood that the application 505 can comprise any code (e.g. a driver, print driver, extensions, plugins, or other features) that runs within an application's sandbox.

The application sandbox 520 has a virtual file system 525 and virtual registry 530. The virtual file system 525 is configured to write to, and read from, a virtual disk 540 (e.g. a "disc" or "disk") stored in storage location 535. The virtual registry 530 is configured to write to, and read from, a virtual registry 550 stored in storage location 545.

It should be understood that the virtual disk 540 can be a separate, possibly hidden, per-sandbox folder stored on the real storage location 565 (e.g. the real file system) that is managed by the sandbox 520, and that the virtual registry 550 can be a separate per-sandbox registry "key" within the real registry 570 that is managed by the sandbox 520. In some embodiments, the sandbox 520 can persist an application's virtualized data across sessions. In other embodiments, the sandbox 520 may not persist the application's virtualized data across sessions.

When operations are required, a determination can be made as to whether the sandbox 520 has a private copy of the item being read as illustrated at 555. If it does, the item can simply be read from the virtual disk 540 or virtual registry 550. However, if the sandbox 520 does not have a copy of the item being read, the item has to be read from the real storage location 565 (e.g. file system) and real registry 570 associated with the operating system 560.

Figure 6:
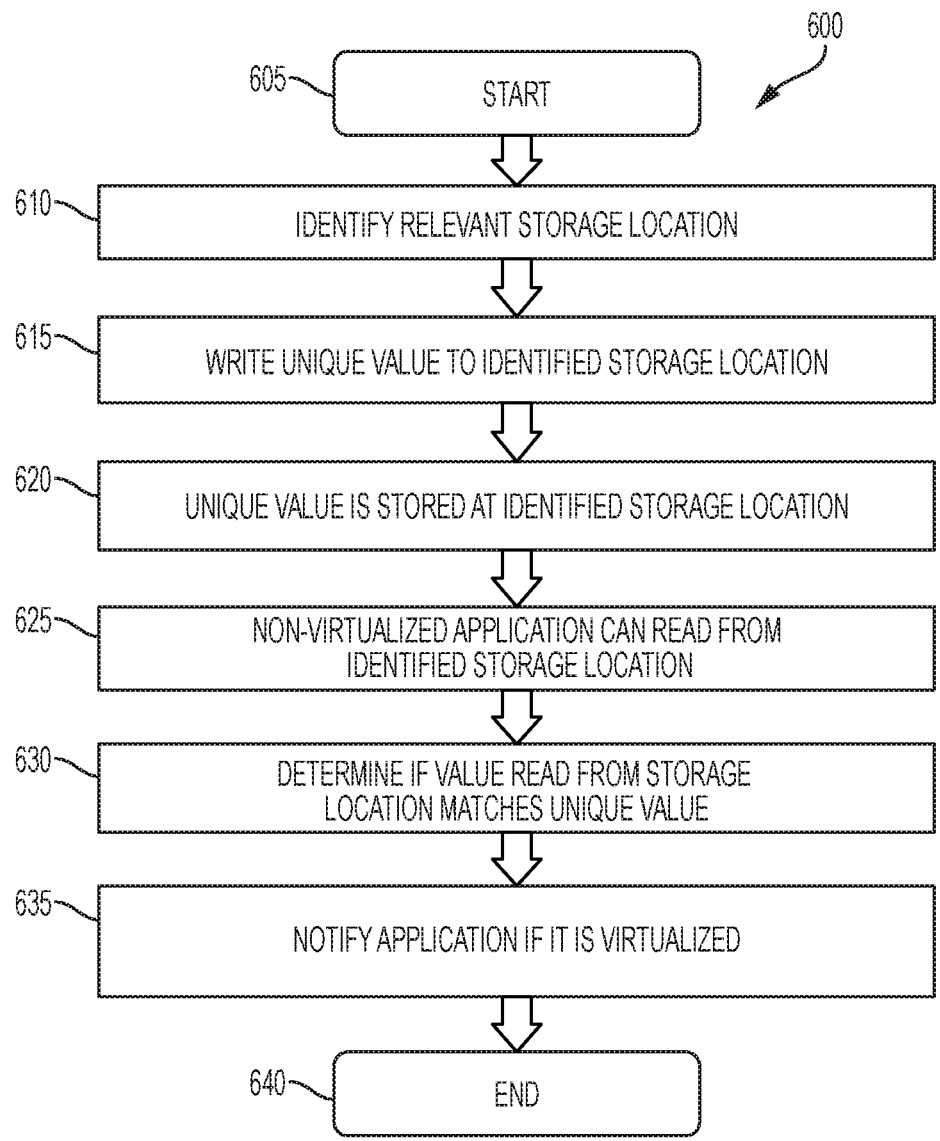
FIG. 6 depicts a flow chart of steps associated with a method for detecting virtualization in accordance with disclosed embodiments.

FIG. 6 illustrates a flow chart 600 of steps associated with a method for detecting virtualization in accordance with the disclosed embodiments. The method starts at 605.

At step 610 a relevant storage location can be identified (i.e. a location in the file system or registry). Because the application is unable to determine if it is in a sandbox, the identified relevant storage location may be a virtual storage location or it may be a real storage location. In certain embodiments, the selection of the storage location can include a strategic selection of a storage location where virtualization is suspected.

With a relevant storage location identified, a value can be written to the storage location as shown at 615. The value written to the storage location can be unique. It is noteworthy that a unique value can include a randomly generated value, an iteratively generated value, a different value from the currently stored value at the storage location, or any other type of unused value. The written value is then stored at step 620 to the storage location.

At step 625, a read request can be initiated from the identified storage location using a non-virtualized process. In this step it is critically important that the read request come from a non-virtualized process because, if the read is made by a virtualized process (e.g. associated with the application), it may make the read from virtualized storage, defeating the purpose of the virtualization determination illustrated in flow chart 600.

A number of non-virtualized processes can be used to complete the read necessary for the virtualization detection. This can generally be understood as a virtualization detector. In some embodiments, this can include a system service, a system process, a port monitor, a language monitor, or any other application known to not be virtualized or sandboxed.

At step 630 a check can be performed to determine if the read from the non-virtualized process matches the unique value. For example, if the application is sandboxed, the originally selected storage location will be a virtual storage location. When the non-virtualized process sends the read request to the real storage location associated with the identified storage location, the value at that location will not match the unique value originally written by the application.

However, if the application is not in a sandbox, the selected storage location is a real storage location (because no virtual location exists). The originally written value will thus be written to the real storage location at step 615. When the virtualization detector reads from the real storage location, the value at that location will match the unique value originally written by the application. The result of the test for virtualization can be provided to the application at step 635.

Virtualization detection thus includes identifying the storage location relevant to the application as a virtualized storage location when the read from the non-virtualized process does not match the value, and identifying the storage location relevant to the application as a non-virtualized storage location when the read from the non-virtualized process does match the value. The method ends at 640.

Figure 7A:
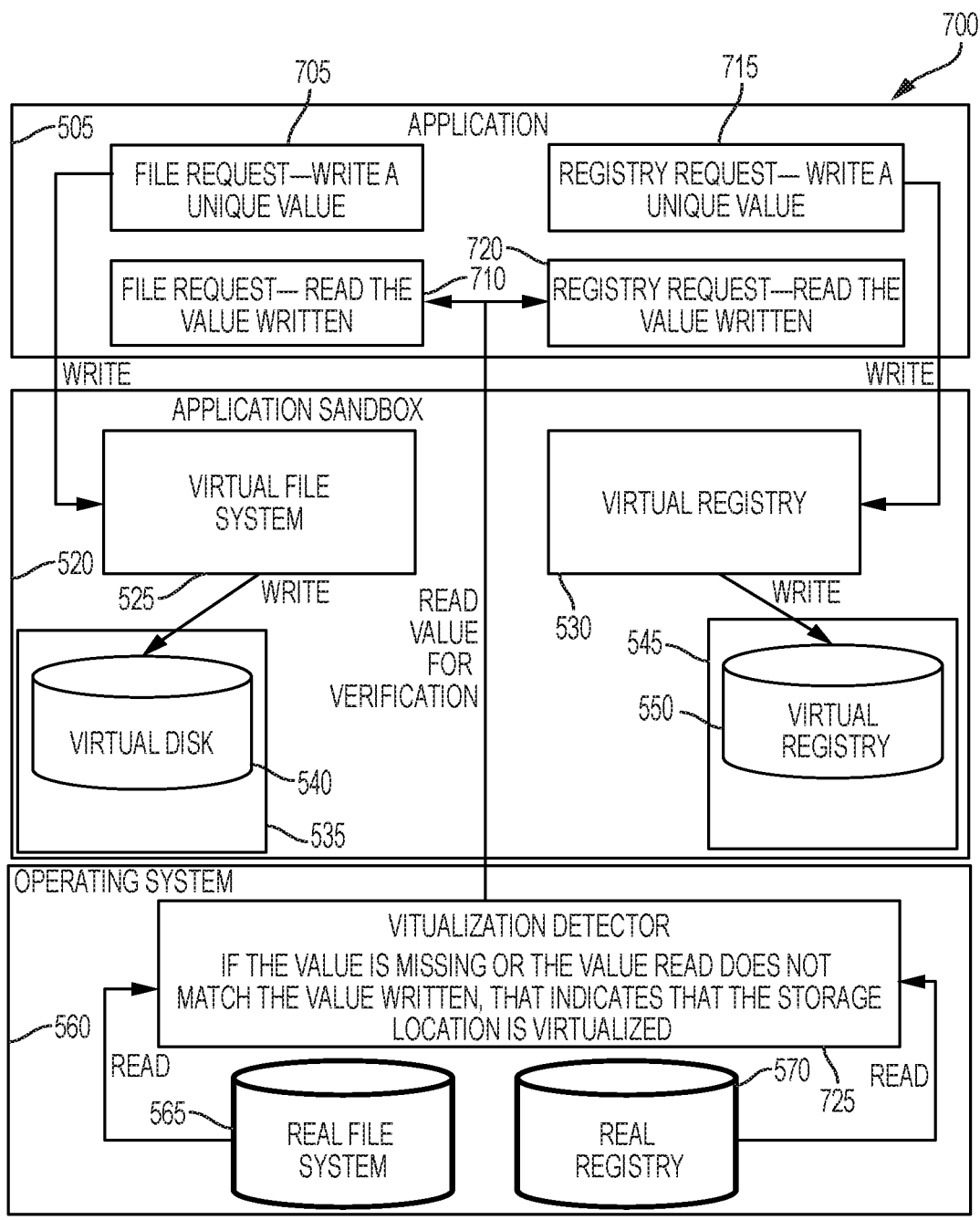
FIG. 7A depicts a flow chart of steps associated with detecting virtualization when an application is sandboxed in accordance with disclosed embodiments.

FIG. 7A illustrates a block diagram 700 showing virtualization detection when a virtualized application is being used, in accordance with the disclosed embodiments. The application 505 can send a file request 705 to a virtual file system 525 in the application sandbox 520. It should also be understood, as noted above, that the application 505 can comprise any code (e.g. a driver, print driver, extensions, plugins, or other features) that runs within an application's sandbox. The file request 705 writes a unique value to the virtual file system 525. In certain embodiments, this can be a randomly generated value, iteratively generated value, or other such unique value as described herein. The virtual file system 525 writes the unique value to the virtual disk 540 (e.g. a "disc" or "disk") in storage location 535.

Similarly, a registry request 715 can be sent to a virtual registry 530, in the application sandbox 520. The registry request 715 can write a unique value to the virtual registry 530. The virtual registry 530 writes to the virtual registry 550 associated with storage location 545.

The virtualization detector 725 runs in a non-virtualized/non-sandboxed process. The virtualization detector 725 can read values from the real storage location 565 (e.g. file system) and/or real registry 570. When detection of virtualization is desired, the application 505 can send a file request 710 and/or registry request 720 to read the unique value (i.e. the unique value provided to the virtual file system 525 and virtual registry 530 respectively) from the real storage location 565 (e.g. file system) and the real registry 570 associated with the operating system 560.

Because the application is sandboxed, a value read from the real storage location 565 (e.g. file system) will not match the unique value written to the virtual disk 523, and the read from the real registry 570 will not match the unique value written to the virtual registry 545. When the values do not match, the virtualization detector can notify that application that it is in a sandbox.

Figure 7B:
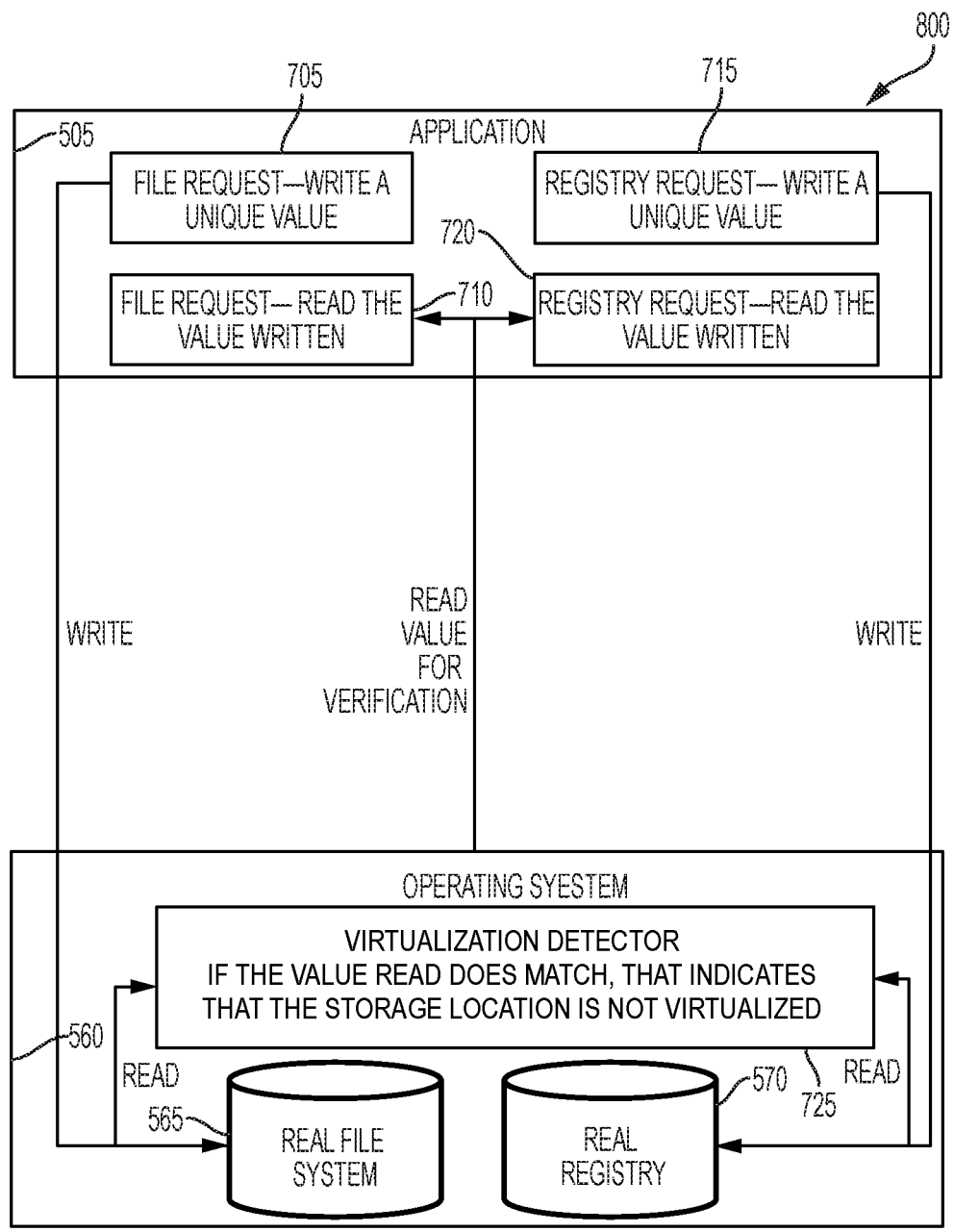
FIG. 7B depicts a flow chart of steps associated with detecting virtualization when an application is not sandboxed in accordance with disclosed embodiments.
Figure 8:
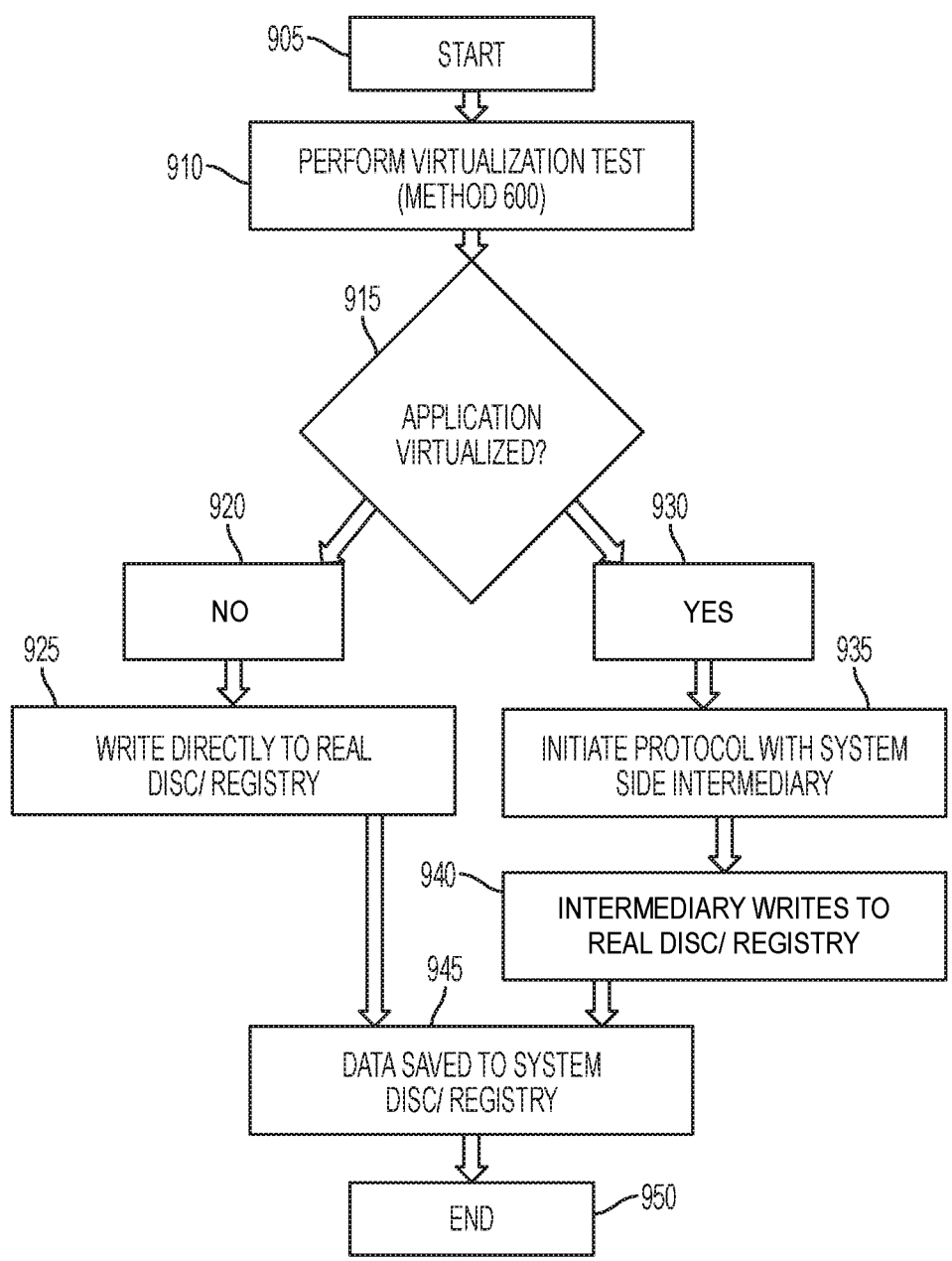
FIG. 8 depicts a flow chart of steps associated with a method for writing from an application to a system in accordance with the disclosed embodiments.

FIG. 7B illustrates a block diagram 800 showing virtualization detection of a non-virtualized application, in accordance with the disclosed embodiments. As illustrated in FIG. 7B, the application 505 can send a file request 705 to a real storage location 565 (e.g. file system). In certain embodiments, this can be a randomly generated value, iteratively generated value, or other such unique value. The registry request 715 can be sent to the real registry 570. The registry request 715 can write a unique value to the real registry 570.

As illustrated in FIG. 7B, the application 505 is not sandboxed. Thus, when the file request 705 and the registry request 715 attempt to write to the selected storage locations, that data is not saved in a virtualized file system and virtualized registry. Thus, the data is sent to the real storage location 565 (e.g. file system) and real registry 570 associated with operating system 560.

The application 505 can then send a file request 710 to read the written value from the real storage location 565 (e.g. file system) and can send a registry request 720 to read the value written to the real registry 570. In this case, the written values were written to the real storage location 565 (e.g. file system) and real registry. Thus, the file request and registry request will return the unique value written to the real storage location 565 (e.g. file system) and/or the real registry 570. The virtualization detector 725 can check if the unique value matches the value returned from the real storage location 565 (e.g. file system) and the real registry 570. As illustrated in FIG. 7B, because the application 505 is not virtualized, the values do match. The virtualization detector 725 can notify the application that it is not virtualized.

It should be appreciated that the determination of whether the application is sandboxed can lead to significant efficiency improvements. Specifically, in situations where an application is unable to determine whether or not it is sandboxed, it is not safe to attempt to write data to the real file system or real registry. If the application is sandboxed, when the application attempts to write to the real storage location (e.g. file system) or real registry, the data will be saved in the virtual file system or virtual registry. Thus, if the application, or some other application attempts to access the data stored in the real file system or real registry, the returned value will be incorrect. Thus, the alternative is to always use a system service, a system process, a port monitor, a language monitor, or any other application known to not be virtualized or sandboxed, to write from an application to the real system registry. While this guarantees that the data will be saved to the real file system or registry, it is also computationally expensive.

Thus, in accordance with the disclosed embodiments, when an application needs to write to the real storage location or registry, regardless of whether or not the application is virtualized, a method 900 can be used. The method starts at 905. The application can initially complete the virtualization detection method 800, as illustrated at block 910. If the virtualization test 915 indicates the application is not virtualized at 920, the application can simply write directly to the real storage location or real registry as shown at 925. It should be noted that this is the more computationally efficient option.

If the application is virtualized, as illustrated by block 930 the application can initiate a protocol with a non-virtualized intermediary as illustrated at 935. One common option is to use a system service, a system process, a port monitor, a language monitor, or any other application known to not be virtualized or sandboxed as an intermediary for transferring data from the virtualized application to the real file system or real registry. The intermediary is then used to write data from the application to the real storage location (file system) or real registry as shown at 940. This process is more computationally expensive than simply writing directly to the real disc or real registry. However, in either case, the desired application data can be stored on the real storage location or real registry at 945 and the method ends at 950.

The disclosed embodiments, thus provide a solution that comprises identifying when an application is virtualized. The solution includes writing a unique value to the part of the registry and/or file system that is to be tested for virtualization from an application or driver, extension, plugin, or other feature executing within the sandboxed application, using a native API. Then a non-virtualized (e.g. system side) application can be used to read that same registry value from the real system registry and/or real disc. The unique value can then be compared to the saved value to determine if the application is virtualized. In some cases, the results of this test can be used to create a flag. The flag can be instance specific or can be used for the life of the process in cases where this only needs to be done once.

If value read back matches the random value just written, then the registry is not virtualized and drivers, extensions, plugins, and other features executing within the sandboxed application can freely use the fast, native APIs for both reading and writing. But if they differ, then the drivers, extensions, plugins, and other features executing within the sandboxed application cannot directly write to the real system registry and therefore must use the slower approach utilizing a system service, system process, port monitor, language monitor, or any other application known to not be virtualized or sandboxed as an intermediary for all writes.

The disclosed embodiments thus eliminate the performance cost of using a non-virtualized application, and provide 100% consistent functionality when an application is virtualized. The embodiments further maintain strong protection to prevent unauthorized use of the intermediary to write to storage locations belonging to another component.

Based on the foregoing, it can be appreciated that a number of embodiments, preferred and alternative, are disclosed herein. For example, in one embodiment a method comprises identifying a storage location relevant to an application; writing a value to said storage location; storing said value written to said storage location on said application; reading said identified storage location with a non-virtualized process; and checking if said read from said non-virtualized process matches said value.

In an embodiment, identifying a storage location relevant to an application further comprises selecting a storage location where a virtualization is suspected.

In an embodiment, said value written to said storage location comprises a different value from a currently stored value at said storage location. In an embodiment, the different value from a currently stored value at said storage location further comprises at least one of: a unique value, a randomly generated value, an iteratively generated value, and an unused value.

In an embodiment, the method further comprises identifying said storage location relevant to said application as a virtualized storage location when said read from said non-virtualized process does not match said value.

In an embodiment, the method further comprises identifying said storage location relevant to said application as a non-virtualized storage location when said read from said non-virtualized process does match said value.

In an embodiment, reading said identified storage location with a non-virtualized process further comprises reading said identified system memory location with at least one of a system service, a system process, a port monitor, a language monitor, a non-virtualized process.

In another embodiment, a system comprises at least one processor; and a storage device communicatively coupled to said at least one processor, said storage device storing instructions which, when executed by said at least one processor, cause said at least one processor to perform operations comprising: identifying a storage location relevant to an application; writing a value to said storage location, storing said value written to said storage location on said application, reading said identified storage location with a non-virtualized process, and checking if said read from said non-virtualized process matches said value.

In an embodiment, identifying a storage location relevant to an application further comprises selecting a storage location where a virtualization is suspected.

In an embodiment, said value written to said storage location comprises a different value from a currently stored value at said storage location. In an embodiment, said different value from a currently stored value at said storage location further comprises at least one of: a unique value, a randomly generated value, an iteratively generated value, and an unused value.

In an embodiment, the system further comprises identifying said storage location relevant to said application as a virtualized storage location when said read from said non-virtualized process does not match said value.

In an embodiment, the system further comprises identifying said storage location relevant to said application as a non-virtualized storage location when said read from said non-virtualized process does match said value.

In an embodiment, reading said identified storage location with a non-virtualized process further comprises reading said identified system memory location with at least one of: a system service, a system process, a port monitor, a language monitor, a non-virtualized process.

In another embodiment, a method comprises: identifying a storage location relevant to an application, writing a value to said storage location, storing said value written to said storage location on said application, reading said identified storage location with a non-virtualized process, checking if said read from said non-virtualized process matches said value, identifying said storage location relevant to said application as a virtualized storage location when said read from said non-virtualized process does not match said value, identifying said storage location relevant to said application as a non-virtualized storage location when said read from said non-virtualized process does match said value, and flagging said non-virtualized storage location as non-virtualized.

In an embodiment, identifying a storage location relevant to an application further comprises selecting a storage location where a virtualization is suspected.

In an embodiment, said value written to said storage location comprises a different value from a currently stored value at said storage location. In an embodiment, said different value from a currently stored value at said storage location further comprises at least one of: a unique value, a randomly generated value, an iteratively generated value, and an unused value.

In an embodiment, reading said identified storage location with a non-virtualized process further comprises reading said identified system memory location with at least one of: a system service, a system process, a port monitor, a language monitor, and a non-virtualized process.

In an embodiment, the method further comprises writing data directly from said flagged application to said non-virtualized storage, writing data to a system side intermediary from said application when said storage location relevant to said application is a virtualized storage location, and writing from said system side intermediary to said non-virtualized storage.

It will be appreciated that variations of the above-disclosed and other features and functions, or alternatives thereof, may be desirably combined into many other different systems or applications. Also, it should be understood that various presently unforeseen or unanticipated alternatives, modifications, variations or improvements therein may be subsequently made by those skilled in the art which are also intended to be encompassed by the following claims.

What is claimed is:

1. A method comprising:
   identifying a storage location relevant to an application;
   writing a value to said storage location;
   storing said value written to said storage location on said application;
   reading said identified storage location with a non-virtualized process;
   checking when said read from said non-virtualized process matches said value;
   creating a flag when said read from said non-virtualized process matches said value, wherein said flag is instance specific or is usable for a life of said non-virtualized process.

2. The method of claim 1 wherein:
   identifying a storage location relevant to an application further comprises: selecting a storage location where a virtualization is suspected; and
   when it is determined that the application is virtualized, initiating a protocol with a non-virtualized intermediary.

3. The method of claim 1 wherein said value written to said storage location comprises:
   a different value from a currently stored value at said storage location.

4. The method of claim 3 wherein said different value from a currently stored value at said storage location further comprises at least one of:
   a unique value;
   a randomly generated value;
   an iteratively generated value; and
   an unused value.

5. The method of claim 1 further comprising:
   identifying said storage location relevant to said application as a virtualized storage location when said read from said non-virtualized process does not match said value.

6. The method of claim 1 further comprising:
   identifying said storage location relevant to said application as a non-virtualized storage location when said read from said non-virtualized process does match said value.

7. The method of claim 1 wherein said identified storage location comprises an identified system memory location and wherein said reading said identified storage location with a non-virtualized process further comprises:
   reading said identified system memory location with at least one of:
   a system service;
   a system process;
   a port monitor;
   a language monitor; and
   a non-virtualized process.

8. A system comprising:
   at least one processor; and
   a storage device communicatively coupled to said at least one processor, said storage device storing instructions which, when executed by said at least one processor, cause said at least one processor to perform operations comprising:
   identifying a storage location relevant to an application;
   writing a value to said storage location;
   storing said value written to said storage location on said application;
   reading said identified storage location with a non-virtualized process;
   checking when said read from said non-virtualized process matches said value;
   creating a flag when said read from said non-virtualized process matches said value, wherein said flag is instance specific or is usable for a life of said non-virtualized process.

9. The system of claim 8 wherein:
   identifying a storage location relevant to an application further comprises: selecting a storage location where a virtualization is suspected; and when it is determined that the application is virtualized, initiating a protocol with a non-virtualized intermediary.

10. The system of claim 8 wherein said value written to said storage location comprises:
   a different value from a currently stored value at said storage location.

11. The system of claim 10 wherein said different value from a currently stored value at said storage location further comprises at least one of:
   a unique value;
   a randomly generated value;
   an iteratively generated value; and
   an unused value.

12. The system of claim 8 further comprising:
   identifying said storage location relevant to said application as a virtualized storage location when said read from said non-virtualized process does not match said value.

13. The system of claim 8 further comprising:
   identifying said storage location relevant to said application as a non-virtualized storage location when said read from said non-virtualized process does match said value.

14. The system of claim 8 wherein said identified storage location comprises an identified system memory location and wherein said reading said identified storage location with a non-virtualized process further comprises:
   reading said identified system memory location with at least one of:
   a system service;
   a system process;
   a port monitor;
   a language monitor;
   a non-virtualized process.

15. A method comprising:
   identifying a storage location relevant to an application;
   writing a value to said storage location;
   storing said value written to said storage location on said application;
   reading said identified storage location with a non-virtualized process;
   checking if said read from said non-virtualized process matches said value;
   identifying said storage location relevant to said application as a virtualized storage location when said read from said non-virtualized process does not match said value;
   identifying said storage location relevant to said application as a non-virtualized storage location when said read from said non-virtualized process matches said value; and
   flagging with a flag, said non-virtualized storage location as non-virtualized, wherein said flag is instance specific or is usable for a life of said non-virtualized process.

16. The method of claim 15 wherein:
   identifying a storage location relevant to an application further comprises: selecting a storage location where a virtualization is suspected; and
   when it is determined that the application is virtualized, initiating a protocol with a non-virtualized intermediary.

17. The method of claim 15 wherein said value written to said storage location comprises:
   a different value from a currently stored value at said storage location.

18. The method of claim 17 wherein said different value from a currently stored value at said storage location further comprises a plurality of different values including:
   a unique value;
   a randomly generated value;
   an iteratively generated value; and
   an unused value.

19. The method of claim 15 said identified storage location comprises an identified system memory location and wherein said reading said identified storage location with a non-virtualized process further comprises:
   reading said identified system memory location with at least one of:
   a system service;
   a system process;
   a port monitor;
   a language monitor;
   a non-virtualized process.

20. The method of claim 15 further comprising:
   writing data directly from said application to said non-virtualized storage;
   writing data to a system side intermediary from said application when said storage location relevant to said application is a virtualized storage location; and
   writing from said system side intermediary to said non-virtualized storage.

* * * * *